F. A. LANE.
TEAT CUP FOR MILKING MACHINES.
APPLICATION FILED MAR. 6, 1911.

1,015,032.

Patented Jan. 16, 1912.

Witnesses.
A. G. Dimond
C. C. Easterbrooks

Inventor
Frederic A. Lane,
By Wilhelm, Parker & Hard,
Attorneys.

UNITED STATES PATENT OFFICE.

FREDERIC A. LANE, OF LITTLE FALLS, NEW YORK, ASSIGNOR TO D. H. BURRELL & COMPANY, OF LITTLE FALLS, NEW YORK.

TEAT-CUP FOR MILKING-MACHINES.

1,015,032. Specification of Letters Patent. Patented Jan. 16, 1912.

Application filed March 6, 1911. Serial No. 612,521.

*To all whom it may concern:*

Be it known that I, FREDERIC A. LANE, a citizen of the United States, residing at Little Falls, in the county of Herkimer and State of New York, have invented a new and useful Improvement in Teat-Cups for Milking-Machines, of which the following is a specification.

This invention relates to teat cups for milking machines operating by suction, and particularly to cups which are provided near the upper end or mouthpiece with a transverse flexible diaphragm which is secured at its outer edge or marginal portion to the cup and has a central opening through which the teat extends into the cup, the annular diaphragm being free at its inner portion around said opening and fitting closely against the teat so as to form a practically air-tight closure at the top of the cup and around the teat.

The object of this invention is to secure the annular diaphragm to the cup in such manner that it is securely held in place in the cup and at the same time capable of yielding somewhat at its points of attachment to the pressure exerted upon the diaphragm as the cup is applied to the teat.

Figure 1:
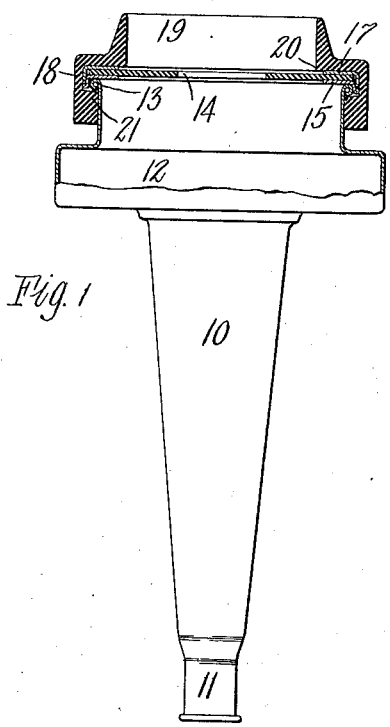
Figure 2:
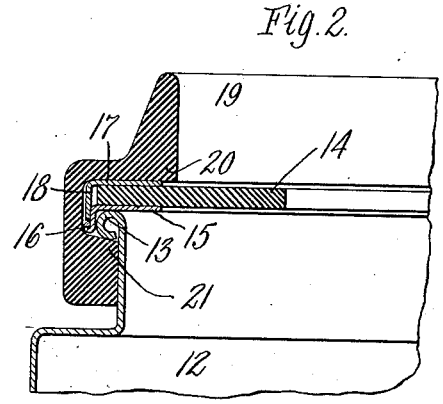
Figure 3:
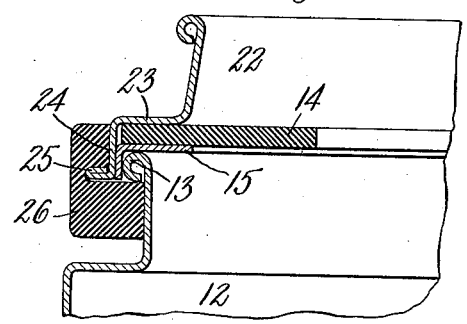
Figure 4:
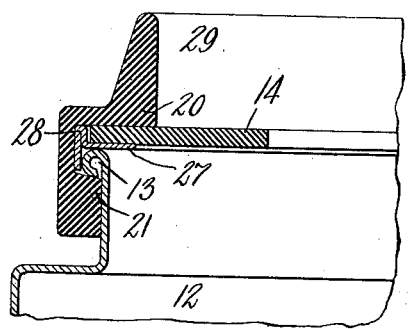
Figure 5:
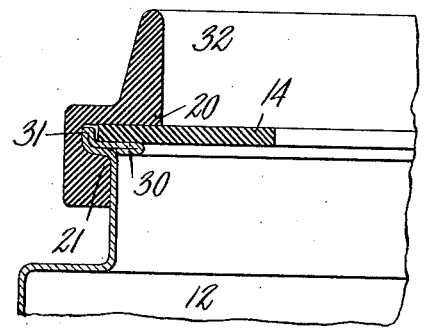

In the accompanying drawings: Figure 1 is an elevation, partly in section, of a teat cup embodying this invention. Fig. 2 is a sectional elevation of the upper portion of the teat cup, on an enlarged scale. Figs. 3, 4 and 5 are similar sectional views illustrating modified forms of the invention.

Like reference characters refer to like parts in the several figures.

10 represents the body of the teat cup constructed of sheet metal or other suitable material and provided at its lower end with a nipple 11 for connection with the suction pipe of a milking machine. The body is preferably provided with an annular enlargement 12 near its upper end but the invention is also applicable to other forms of cups. The body is provided at its upper end with an external rim, bead or flange 13 formed on the body by bending or curling the edge portion of the body, or in any other suitable manner.

14 represents the flexible annular diaphragm, preferably of sheet rubber, and resting upon a stiff or rigid supporting washer 15 which rests with its outer or marginal portion upon the upper edge of the cup and is provided with a marginal flange 16 extending downwardly on the outer side of the rim 13.

17 represents a similar stiff or rigid washer which rests upon the marginal portion of the diaphragm and has a marginal flange 18 extending downwardly on the outer side of the flange 16 of the supporting washer.

19 represents the mouthpiece of rubber having an inwardly extending upper shoulder 20 by which it bears upon the upper washer 17, and having further an inwardly extending lower shoulder 21 by which it bears against the under side of the rim 13. This mouthpiece is sprung or stretched over the upper washer 17, the diaphragm 14, the lower washer 15 and the rim 13 and secures the parts together. This connection is sufficiently strong to hold the diaphragm in position in use and to establish a practically air-tight joint of the diaphragm with the body of the cup, and is at the same time sufficiently yielding to allow the diaphragm to be drawn inwardly with its marginal portion under excessive strains without impairing the air-tight connection, thereby avoiding excessive stretching or rupturing of the diaphragm when the cup is applied to a teat of unusual size or the diaphragm is otherwise subjected to unusual strain.

The strains falling upon the diaphragm in use are by reason of this yielding connection distributed around the circumference of the diaphragm and equalized, whereby the diaphragm is rendered less liable to lose its flexibility or elasticity in service. When the excessive strain on the diaphragm ceases it recovers its original position to a considerable extent if not entirely. If the diaphragm is required to be renewed or the parts are required to be separated for cleaning, this can be readily done because the yielding mouthpiece can be readily detached from the body of the cup.

The mouthpiece forms an elastic attaching collar which bears with its lower shoulder upwardly against the attaching rim of the cup and with its upper shoulder downwardly, pressing the washers and the diaphragm against the cup and pinching or clamping the marginal portion of the diaphragm between the washers. This elastic collar is not liable to become bruised or deformed in use but retains its form and can therefore be easily applied or removed, and protects the cup, the rigid washers and the diaphragm.

The washers are preferably stamped from sheet metal and the diaphragm is preferably made of highly flexible sheet rubber and as it is comparatively inexpensive the cup can be kept in excellent working condition at little expense by renewing the diaphragm from time to time.

In the modified construction represented in Fig. 3, the upper washer is omitted, the mouthpiece 22 is made of rigid material, for instance, sheet metal, and provided with a horizontal shoulder 23 which bears upon the marginal portion of the diaphragm and with a base portion 24 which extends downwardly on the outer side of the lower washer and is provided with an outwardly projecting flange or rim 25. The flexible attaching collar 26 engages with its upper shoulder over this flange and with its lower shoulder against the underside of the attaching rim 13 of the cup.

In the modified construction represented in Fig. 4, the lower washer 27 is provided with a flange or collar 28 which is raised above the flat portion of the washer and holds the diaphragm against lateral displacement, the upper washer is omitted, and the rubber mouthpiece 29 bears with its upper shoulder directly upon the diaphragm and with its lower shoulder against the under side of the attaching rim 13 of the cup.

In the modified construction represented in Fig. 5, both washers are omitted, the cup is provided at its top with a horizontal supporting flange 30 upon which the diaphragm rests and with an external attaching rim 31, preferably formed in one piece with the cup and with the horizontal flange 30. The rubber mouthpiece 32 bears with its upper shoulder upon the diaphragm and with its lower shoulder against the under side of the attaching rim 31.

I claim as my invention:

1. The combination with a teat cup, of a flat annular diaphragm, a flat support for the flat marginal portion of said diaphragm arranged on said cup, and an elastic attaching collar engaging said cup and holding said diaphragm on said support, substantially as set forth.

2. The combination with a teat cup provided with an external attaching rim, of a flat annular diaphragm, a flat support for the flat marginal portion of said diaphragm arranged on said cup, and an elastic attaching collar engaging said rim and securing the diaphragm to the cup, substantially as set forth.

3. The combination with a teat cup provided with an external attaching rim, of a flat flexible diaphragm, means for supporting the diaphragm on the cup, and an elastic attaching collar engaging said rim and securing the diaphragm to the cup, substantially as set forth.

4. The combination with a teat cup provided with an external attaching rim, of an annular flexible diaphragm, means for supporting the diaphragm on the cup, and an elastic attaching collar bearing against the lower side of said rim and extending with its upper portion inwardly over the diaphragm and securing the latter to the cup, substantially as set forth.

5. The combination with a teat cup provided with an external attaching rim, of an annular flexible diaphragm, a rigid washer resting on said cup and supporting the marginal portion of said diaphragm, and an elastic attaching collar engaging said rim and securing the diaphragm to the cup, substantially as set forth.

6. The combination with a teat cup provided with an external attaching rim, of an annular flexible diaphragm, a rigid lower washer resting on said cup and supporting the marginal portion of said diaphragm, a rigid upper washer resting on the marginal portion of said diaphragm, and an elastic attaching collar engaging said rim and said upper washer and securing the diaphragm to the cup, substantially as set forth.

Witness my hand in the presence of two subscribing witnesses.

FREDERIC A. LANE.

Witnesses:
GEO. W. BELLINGER,
D. H. BURRELL, Jr.

---

Copies of this patent may be obtained for five cents each, by addressing the "Commissioner of Patents, Washington, D. C."